United States Patent
Pathirane (10) Patent No.: US 11,216,277 B2
(45) Date of Patent: Jan. 4, 2022

(54) APPARATUS AND METHOD OF CAPTURING A REGISTER STATE

(71) Applicant: Arm Limited, Cambridge (GB)

(72) Inventor: Chiloda Ashan Senarath Pathirane, Cambourne (GB)

(73) Assignee: Arm Limited, Cambridge (GB)

( * ) Notice: Subject to any disclaimer, the term of this patent is extended or adjusted under 35 U.S.C. 154(b) by 287 days.

(21) Appl. No.: 16/583,729

(22) Filed: Sep. 26, 2019

(65) Prior Publication Data

US 2021/0096863 A1 Apr. 1, 2021

(51) Int. Cl.
 *G06F 9/30* (2018.01)
 *G06F 9/38* (2018.01)
 *G06F 11/07* (2006.01)

(52) U.S. Cl.
 CPC ...... *G06F 9/30116* (2013.01); *G06F 9/30134* (2013.01); *G06F 9/384* (2013.01); *G06F 9/3834* (2013.01); *G06F 11/0772* (2013.01)

(58) Field of Classification Search
 CPC .................................................. G06F 9/30116
 See application file for complete search history.

(56) References Cited

U.S. PATENT DOCUMENTS

| | | | | |
|---|---|---|---|---|
| 3,781,810 A | * | 12/1973 | Downing | G06F 9/30123 712/228 |
| 6,378,065 B1 | * | 4/2002 | Arnold | G06F 9/30116 712/228 |
| 8,990,620 B2 | * | 3/2015 | Fleischer | G06F 11/14 714/19 |
| 2003/0023836 A1 | * | 1/2003 | Catherwood | G06F 9/30116 712/225 |
| 2005/0125624 A1 | * | 6/2005 | Rose | G06F 9/30112 711/201 |
| 2008/0034192 A1 | * | 2/2008 | Lin | G06F 9/3863 712/228 |
| 2020/0183700 A1 | * | 6/2020 | Battle | G06F 9/3891 |

* cited by examiner

*Primary Examiner* — Corey S Faherty
(74) *Attorney, Agent, or Firm* — Nixon & Vanderhye P.C.

(57) ABSTRACT

Aspects of the present disclosure relate to an apparatus comprising register circuitry implementing a plurality of registers and processing circuitry to perform data processing operations on data stored in said registers. The apparatus comprises store buffer circuitry to, responsive to a store instruction in respect of given data, temporarily store said given data prior to providing said given data to a memory. Responsive to receiving at the processing circuitry a request to perform a state-saving-triggering operation, the register circuitry is configured to capture in shadow registers of said register circuitry a state of a subset of registers of the plurality of registers, provide the captured state from the shadow registers to the memory.

20 Claims, 4 Drawing Sheets

APPARATUS AND METHOD OF CAPTURING A REGISTER STATE

BACKGROUND

The present technique relates to the field of processing devices.

Some processing devices have a set of registers, accessible to execution circuitry, for storing data that is undergoing processing operations. In some situations, for example when carrying out an interrupt, the contents of these registers may be stored in a storage such as a memory. The latency associated with performing this storage can cause a bottleneck in processing capacity.

SUMMARY

At least some examples provide an apparatus comprising:
register circuitry implementing a plurality of registers;
processing circuitry to perform data processing operations on data stored in said registers;
store buffer circuitry to, responsive to a store instruction in respect of given data, temporarily store said given data prior to providing said given data to a memory;
wherein, responsive to receiving at the processing circuitry a request to perform a state-saving-triggering operation, the register circuitry is configured to:
capture in shadow registers of said register circuitry a state of a subset of registers of the plurality of registers; and
provide the captured state from the shadow registers to the memory.

Further examples provide an apparatus comprising:
register means implementing a plurality of registers;
processing means to perform data processing operations on data stored in said registers;
store buffer means to, responsive to a store instruction in respect of given data, temporarily store said given data prior to providing said given data to a memory;
wherein, responsive to receiving at the processing circuitry a request to perform a state-saving-triggering operation, the register means is configured to:
capture in shadow registers of said register means a state of a subset of registers of the plurality of registers; and
provide the captured state from the shadow registers to the memory.

Further examples provide a method comprising:
storing data in registers associated with processing circuitry;
receiving a request to perform a state-saving-triggering operation in respect of given data of said data; and
responsive to said request:
capturing, in shadow registers corresponding to said registers, a state of a subset of said registers; and
providing the captured state from the shadow registers to a memory.

Further aspects, features and advantages of the present technique will be apparent from the following description of examples, which is to be read in conjunction with the accompanying drawings.

DESCRIPTION OF EXAMPLES

As described above, a processing apparatus can comprise register circuitry implementing a plurality of registers, and processing circuitry to perform data processing operations on data stored in said registers. This data, when required for processing operations, may be retrieved from a memory to be stored in the registers.

The apparatus comprises store buffer circuitry to, responsive to a store instruction in respect of given data (for example if the given data is, at least temporarily, no longer required for processing operations or the register storing the given data is needed to store other data), temporarily store said given data prior to providing said given data to a memory. This data is stored in the store buffer with an associated memory address to which it is to be stored. The latency associated with providing the given data to the store buffer is lower than that associated with storing the given data in the memory. The data to be stored can thus be relatively quickly provided to the store buffer, following which processing operations continue while the relatively slower process of storing the data in the memory is performed in parallel.

When data to be stored has been provided to the store buffer, but before it has actually been stored in the memory, the version of that data in the memory will potentially be incorrect if it was modified whilst stored in the registers. Load operations are therefore checked against the store buffer, such that they can be serviced from the store buffer instead of the memory if data to be loaded is in the store buffer. In order to improve cost and processing efficiency, store buffers in some systems have a smaller number of entries than the number of registers. This presents a processing bottleneck if data is to be stored from a large number of registers at approximately the same time such as when performing a state-saving operation to store the state of a set of the registers, for example in response to receiving an interrupt signal.

Increasing the size of the store buffer to reduce this bottleneck would incur costs in terms of physical resources (increased circuit area and power consumption due to the larger circuitry required as a consequence of the increased number of store buffer entries against which each load operation is to be checked).

In order to alleviate this, shadow registers are provided. Responsive to receiving a request to perform a state-saving-triggering operation, such as an interrupt, the register circuitry is configured to capture in the shadow registers a state of a subset of registers of the plurality of registers. The register circuitry then provides the captured state from the shadow registers to the memory. This provision can be via a direct path from the shadow registers to the memory. Alternatively, the shadow registers can drain into existing store buffer storage. The captured state can thereby be stored without incurring the aforementioned bottleneck, and also without increasing the size of the store buffer. Whilst the provision of the shadow registers does use additional resources, examples are provided below by which the impact of this can be reduced relative to comparative systems in which the store buffer is enlarged instead. If the captured state (i.e. the stack) is defined to be non-shared memory, it may be possible to elide the storing in memory of the shadow register content in situations in which a hazard is not detected.

The apparatus may be configured to restore the captured state in the registers after performing the state-saving-triggering operation. Restoring the captured state may comprise, responsive to a determination of a lack of overwriting of the shadow registers, restoring the captured state from the shadow registers. This may be more efficient in terms of use of processing resources than restoring the captured state from memory.

In an example, the processing circuitry is configured to initiate performance of the requested state-saving-triggering operation before completion of provision of the captured state from the register circuitry to the memory. The state-saving-triggering operation (e.g. commencing execution of an interrupt handler) can thus be performed in parallel with the storing of the captured state in the memory, thereby improving processing capacity.

In an example, capturing the state of said subset of registers comprises copying the contents of said subset of registers to the shadow registers. For example, each shadow register may correspond to one of said subset of registers, and capturing the state of a given register of said subset of registers may comprise storing the contents of the said given register in a corresponding shadow register. The (non-shadow) registers are then available for further data (associated with the state-saving-triggering operation).

Alternatively, capturing the state of the subset of registers may comprise updating mapping information identifying which of said plurality of registers are the shadow registers. For example, at a given time a first set of registers may be identified as active non-shadow registers, and a second set may be identified as shadow registers. In order to capture the state, mapping information (for example a single-bit flag) can be updated such that the first set are identified as shadow registers, and the second set are identified as active non-shadow registers for performing the state-saving-triggering operation. The state can thus be efficiently saved without performing multiple copying operations. Hence, in some examples, rather than providing a dedicated set of shadow registers, a single set of registers may be variably partitioned into active non-shadow registers and shadow registers—there is no need for a fixed allocation of shadow registers.

In an example, the processing circuitry is responsive to receiving a memory access request to perform hazard checking to detect whether the memory access request causes a data hazard condition. The data hazard condition occurs at least when, before completion of provision of the captured state to the memory, the memory access request has a potential to access a memory address to which data from one of said shadow registers is still to be saved to memory. It is not essential for the hazard checking to determine whether the memory access request would actually access a memory address to which data from the shadow registers is still to be saved to memory—a memory access request which could potentially access such a memory address may be determined as hazarding even if it does not actually access such a memory address. Simpler, and thus faster and/or more efficient, query functionality can thus be provided for the shadow registers than for the store buffer (in which a memory address may be stored for each entry thereof). Hence, the use of shadow registers for the stacking of register state instead of the store buffer gives the opportunity to use a simpler, less costly, hazarding scheme than would be provided for handling general load/store hazarding in the store buffer, to save circuit area and power.

A consequence of the aforementioned simpler hazard checking is that the hazard checking may permit a false positive detection of the data hazard condition. The probability of this false positive detection of the data hazard condition may be higher for the hazard checking performed for the shadow registers than for hazard checking performed for the store buffer, for example where, as described below, a given data hazard is detected in respect of the shadow registers as a whole as opposed to an individual memory address, or in which any stack-pointer-relative load is considered to hazard if there is still register state to be saved from the shadow registers to memory. Implementing the shadow registers in this manner, such that the probability of a false positive detection is higher than for the store buffer can allow the shadow registers to be implemented with simpler circuitry than the store buffer.

Despite the increased false positive probability, the actual incidence of false positives is reduced when the state-saving-triggering operation is unlikely to require the data that was stored in the registers at the time of receiving the request to perform this operation. For example, in the case of an interrupt, it is unlikely that the interrupt would coincidentally require the data on which the processing circuitry happened to be performing processing operations at the time of receiving the interrupt, since the operations performed by an interrupt handler tend to be independent of operations performed prior to the interrupt occurring. The incidence of false positives can thus be relatively low, such that processing performance is not significantly reduced. Hence, by eliminating the additional comparison circuitry that would be needed for implementing a hazard checking scheme that would avoid such false positives, power and circuit area can be reduced, but nevertheless this may not significantly affect performance.

In an example, capturing the state of said subset of registers comprises storing an indication of a stack frame address range within which the data from said subset of registers is to be saved to memory. For example, the indication of the stack frame address range may comprise a base address of the stack frame address range and an indication of the extent of the stack frame address range. This provides an efficient way of identifying memory addresses associated with the registers to be captured, without requiring an address to be stored for each register. This allows simpler (and thus, as above, more efficient) hazarding circuitry to be used for the shadow registers than for the store buffer (which, in typical implementations, may store a memory address for each entry therein), as it is not necessary to individually compare the address of an incoming load against the address associated with the data in each separate shadow register. Instead when there is at least one shadow register for which state has not yet been stored to memory, a load which specifies any address falling within the stack frame address range could be considered to meet the data hazard condition (even if the load actually specifies an address for which the state from the relevant shadow register has already been saved to memory).

The indication of the stack frame address range by way of a base address and indication of extent may align with MPU-like checks that, in some examples, are performed for all load/stores. In such examples, the number of comparators in the MPU may be increased by 1 (a relatively small proportional increase) to handle the additional hazarding performed here. Furthermore, in examples in which multiple banks of shadow registers are provided (for example to handle multiple levels of interrupt nesting), a single MPU region can be extended for the purposes of the hazarding.

In one example, before completion of the provision of the captured state to the memory and responsive to receiving a data processing request indicating a memory address within the stack frame address range, the processing circuitry is configured to perform a data hazard mitigation action in respect of the received data processing request. The data hazard mitigation action may be performed in response to determination of a data hazard as described above, such as a request to load data from a memory address within the aforementioned stack frame address range. The data hazard mitigation action may comprise delaying processing of the received data processing request until completion of the storing of the captured state in the memory. Whilst this does delay the processing of particular data processing requests, as described above it may be relatively unlikely for a data processing request following a state-saving-triggering operation, such as an interrupt, to require data that coincidentally happened to be stored in the registers prior to the state-saving-triggering operation. The increased efficiency associated with not storing and performing hazarding comparisons on individual memory addresses for each shadow register may thus outweigh the delay associated with data hazard mitigation for processing data processing requests in respect of data that is in the process of being stored from the shadow registers.

In an example, before completion of the provision of the captured state to the memory and responsive to receiving a stack-pointer-relative memory access request for which a target memory address is to be determined relative to a stack pointer, the processing circuitry is configured to perform a data hazard mitigation action in respect of the received data processing request. For example, the processing circuitry may be configured to determine whether to perform the data hazard mitigation action for the stack-pointer-relative memory access request independent of the target memory address. This provides an even simpler hazarding scheme which avoids the need for any address comparisons between an address of a load and addresses to which state from the shadow registers are to be stored. In this approach, during a period when state has been captured in the shadow registers, but saving of this state to memory has not yet completed, any stack-pointer-relative memory access request may be considered to involve a data hazard condition regardless of the actual address accessed by the stack-pointer-relative memory access request. In practice, interrupt handlers do not tend to include stack-pointer-relative loads, so it is relatively unlikely that such a stack-pointer-relative memory access request would occur during the period between capturing the state in the shadow registers and completing saving this state to memory. Therefore, by using a hazarding scheme which treats all stack-pointer-relative requests as hazarding without comparing addresses, this greatly reduces the amount of circuitry required for hazard checking, without significantly affecting performance.

As described above, the state-saving-triggering operation may be an interrupt operation. As other examples, the state-saving-triggering operation may be an exception operation or a function call operation. All of these examples can trigger the saving of the register state, to be restored once the operation has completed execution. For example, the function call operation may be a function call operation that comprises transitioning from a high security operating state to a lower security operating state. In such an example, the registers may contain secure data when the request to perform the function call operation is received. Performing state-saving can therefore provide improved security, by preventing access to the secure data when operating in the lower security state.

It is not essential for all registers to be captured in the shadow registers in response to the state-saving-triggering operation. In some examples, only a subset of the registers may need to be saved on an interrupt, exception or function call. In some cases, the number of registers that need to be saved may depend on the specific type of transition being made (e.g. based on the operating state of the processing circuitry before and/or after the state-saving-triggering operation).

Examples of the present disclosure will now be described with reference to the Figures.

Figure 1:
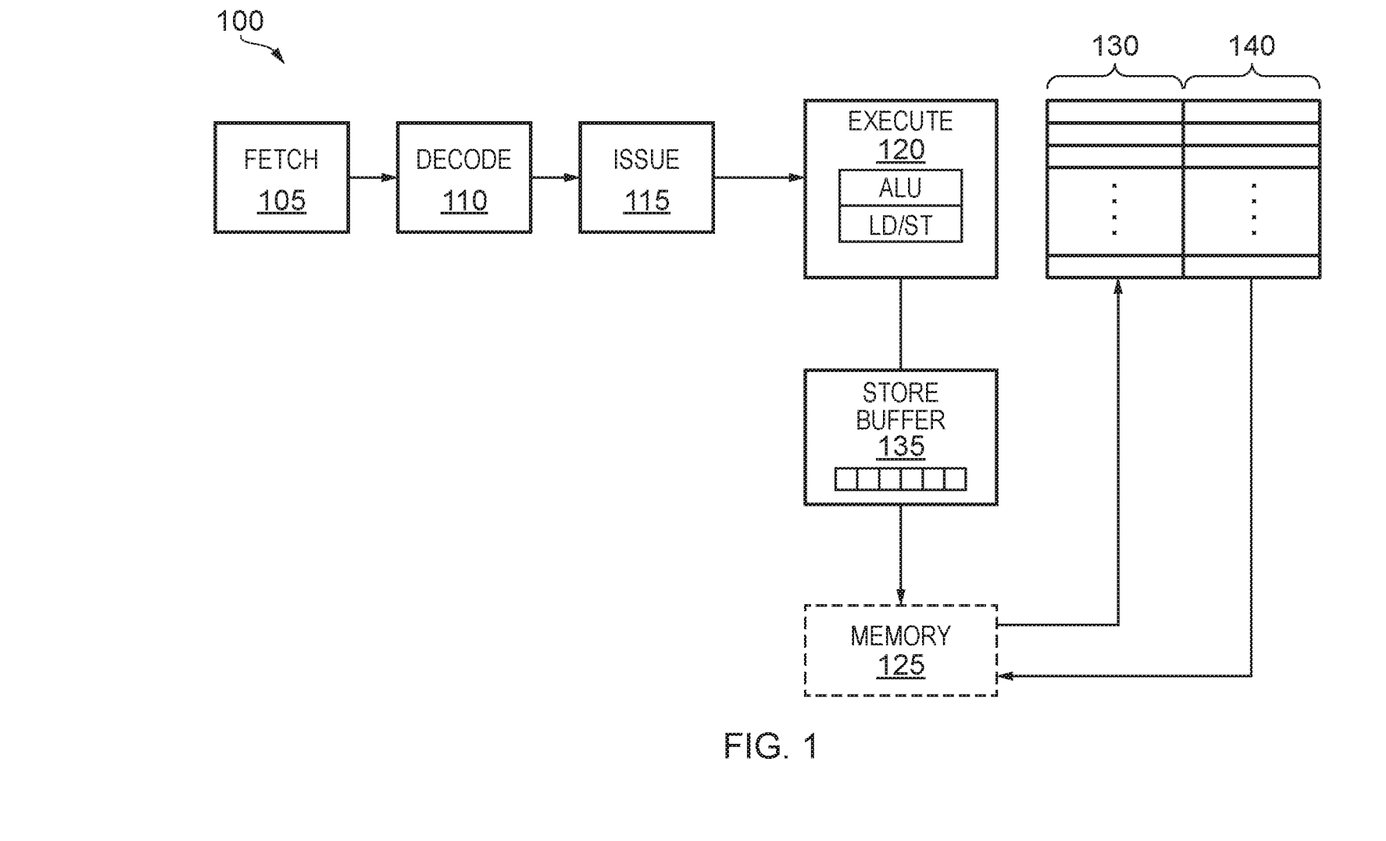
FIG. 1 schematically depicts a processing apparatus according to an example.

FIG. 1 schematically depicts a processing apparatus 100, implementing a processing pipeline, according to an example. The apparatus 100 comprises a series of stages, each being implemented by circuitry. It will be appreciated that this is an example, and other implementations may include additional or fewer stages than those shown.

The apparatus comprises a fetch stage 105 configured to fetch instructions to be executed from an instruction cache or memory. The fetch unit transmits the fetched instructions to a decode stage 110, which decodes received instructions and transmits them to an issue stage 115. The issue stage maintains a queue of received instructions and issues them to execute stage 120. The issuing may be based on an issue policy, for example such that instructions can be issued once all source operands for that instruction are available (the source operands having been produced in earlier instructions).

The execute stage includes execution circuitry modules, such as an arithmetic logic unit (ALU) and a load/store (LD/ST) unit, for performing processing operations. Data on which the processing operations are performed is loaded (responsive to a load command from the LD/ST unit) from a memory 125 (which may be external to apparatus 100) into a bank of registers 130 accessible to the execute stage 120. Conversely, data in a given one of the registers 130 can be stored in the memory 125 responsive to a store command from the LD/ST unit.

In order to store data in the memory 125, the data is first provided to a store buffer 135, which buffers the data to be stored along with an associated memory address. The data is then provided from the store buffer 135 to the memory 125. As explained above, the latency associated with providing data to the store buffer 135 is lower than that associated with providing data to the memory 125. The use of the store buffer 135 in this fashion therefore allows data to be stored to be quickly provided from the registers to the store buffer 135, after which the execute unit 120 is free to continue performing processing operations (with the register from which the data was stored to the store buffer now being available for reuse for other data), whilst the (relatively slow) storing of the data in the memory 125 is performed in the background. As explained above, the store buffer 135 is relatively complex to implement and thus for performance reasons may have a finite number of entries, e.g. in some cases fewer entries than the number of registers. It is thus possible for the store buffer 135 to become full, for example if data from a large number of registers is to be stored at the same time. In such situations the LD/ST unit will be unable to perform further store operations until the buffer 135 has space.

The apparatus 100 comprises shadow registers 140 associated with registers 130. In this example, one shadow register 140 is provided for each register 130. When a state-saving-triggering operation is to be performed, for example an interrupt or a function call, the contents of the registers 130 are copied to the shadow registers 140. The state of the registers 130 at the time of initiating the state-saving-triggering operation is thus captured, and the registers 130 are then available for use in the processing of the state-saving-triggering operation. The captured register state (i.e. the captured contents of the registers 130, as stored in the shadow registers 140) is then stored in the memory 125 in the background whilst the state-saving-triggering operation is processed. The performance of the state-saving-triggering operation can thus be performed in parallel with the relatively time-consuming process of storing the captured state in the memory 125, without filling the store buffer 135. As explained above, a given shadow register 140 is implemented with simpler circuitry than a store buffer entry, as memory addresses are not stored for the shadow registers 140 and also the shadow registers are not subject to the same optimisation constraints as the store buffer 135 (which is optimised for loads hitting in the store buffer 135). It is therefore less expensive in terms of cost, resources and processing capacity to implement the shadow registers 140 than to extend the number of store buffer 135 entries.

Some differences between the processing of state-saving-triggering operations in systems according to the present disclosure, and comparative systems that do not implement the present disclosure, will now be described with reference to FIGS. 2A and 2B.

Figure 2A:
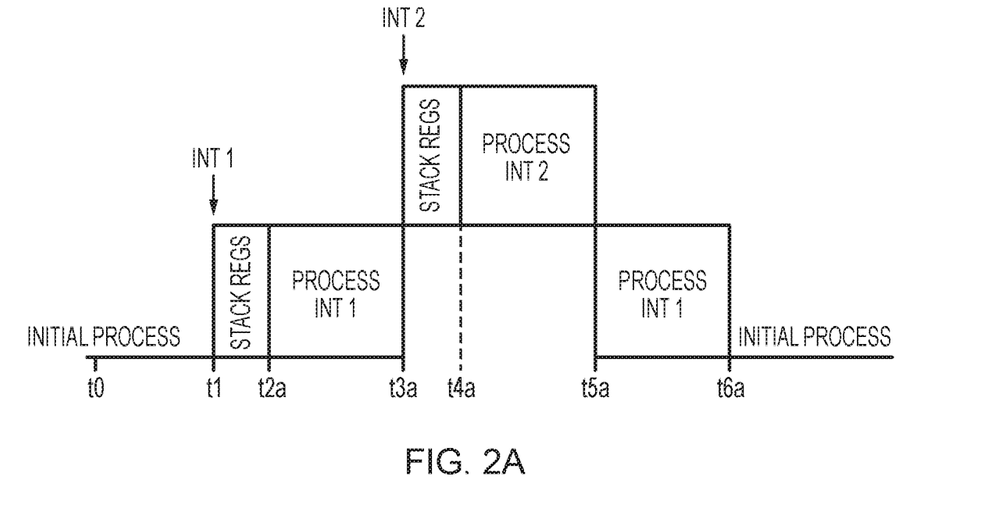
FIGS. 2A and 2B illustrate differences between the processing of state-saving-triggering operations in systems according to the present disclosure, and comparative systems that do not implement the present disclosure.

FIG. 2A illustrates the processing over time of state-saving-triggering operations in a comparative system that does not implement the present disclosure. In this comparative system, no shadow registers are provided and all storing of data in memory is performed via a store buffer.

At a time t0, the system is executing processing instructions (represented by a horizontal line in FIG. 2A) associated with an initial process.

At a time t1, an interrupt INT1 is received. The interrupt INT1 is a state-saving-triggering operation, in that the register state must be saved (for later restoration following completion of processing of INT1) in order to free the registers for processing INT1. This saving is performed by storing the register content in a first stack frame in memory, which can be referred to as "stacking" the registers. Stacking the registers takes a certain amount of time, and is completed at time t2a.

Once the registers have been stacked, INT1 can be processed. At time t3a, during processing of INT1, a further interrupt INT2 is received. As for INT1, the register state must be saved in order to free the registers for processing INT2. The registers are therefore stacked into a second stack frame in memory. This second stacking step is completed at time t4a.

Once the registers have been stacked, INT2 is processed. At a later time t5a, the processing of INT2 is completed. The state of the registers at time t3a is restored from the second stack frame, and processing of INT1 is resumed.

Finally, at time t6a, the processing of INT1 is completed. The state of the registers at time t1 is restored from the first stack frame, and the processing of the initial process continues.

Figure 2B:
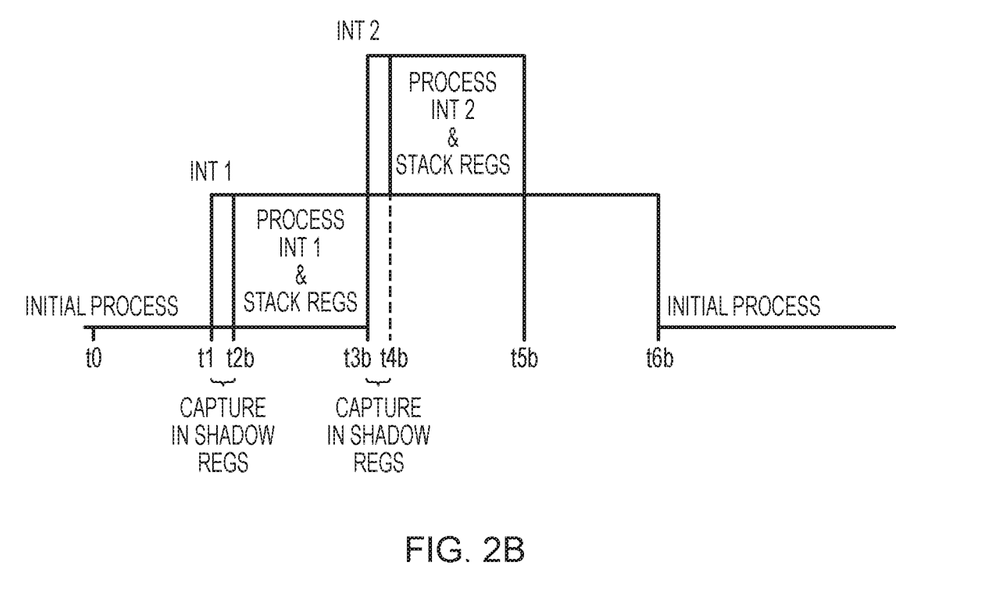

FIG. 2B illustrates the processing over time of the same state-saving-triggering operations INT1 and INT2 in a system according to the present disclosure, in which shadow registers are provided.

As for FIG. 2A, at time t0 the system is executing processing instructions associated with an initial process.

At time t1, the interrupt INT1 is received. The register state is therefore to be saved (for later restoration following completion of the processing of INT1) or order to make the registers available for processing INT1.

The register state is captured in the shadow registers, which is completed at time t2b. Because this capturing is significantly faster than the process of stacking the registers, time t2b is earlier than time t2a. At time t2b, the processing of INT1 and the stacking of the shadow registers begins in parallel.

At time t3b, during processing of INT1, the further interrupt INT2 is received. The register state is therefore to be saved, to free the registers for processing INT2. The register state is captured in the shadow registers, which is completed at time t2b. This capturing is completed at time t4b. As with the case of the capturing preceding the processing of INT1, this is significantly faster than the stacking of registers, and so the delay before the processing of INT2 begins at time t4b is shorter than the corresponding delay between times t3a and t4a in FIG. 2A. Once the capturing is complete at time t4b, the processing of INT2 and the stacking of the shadow registers begins in parallel.

At a later time t5b, the processing of INT2 is completed (the stacking having been completed at an earlier time that is not shown in FIG. 2B). As with FIG. 2A, the state of the registers at time t3b is restored from the second stack frame, and processing of INT1 is resumed.

Finally, as with FIG. 2A, at time t6b the processing of INT1 is completed. The state of the registers at time t1 is restored and the processing of the initial process continues.

It can be seen from a comparison of FIGS. 2A and 2B that the time to capture a register state in shadow registers, in FIG. 2B, is significantly shorter than the time to perform register stacking in FIG. 2A. This means that processing of INT1 and INT2 can begin more promptly following their receipt, and thus be completed more quickly. Systems according to the present disclosure (as shown in FIG. 2B) thus provide performance advantages over comparative systems in which shadow registers are not provided (as shown in FIG. 2A). Whilst the time required to perform register stacking in the system of FIG. 2A could be reduced by increasing the size of the store buffer (thereby reducing or eliminating the bottleneck associated with stacking several registers at the same time), as explained above this would require a greater circuitry area than that associated with provision of shadow registers. One reason for this is that a store buffer would typically implement a uniform hazarding procedure for all entries therein whereas, as described in more detail below, more efficiency hazarding procedures can be implemented for shadow registers.

Figure 3:
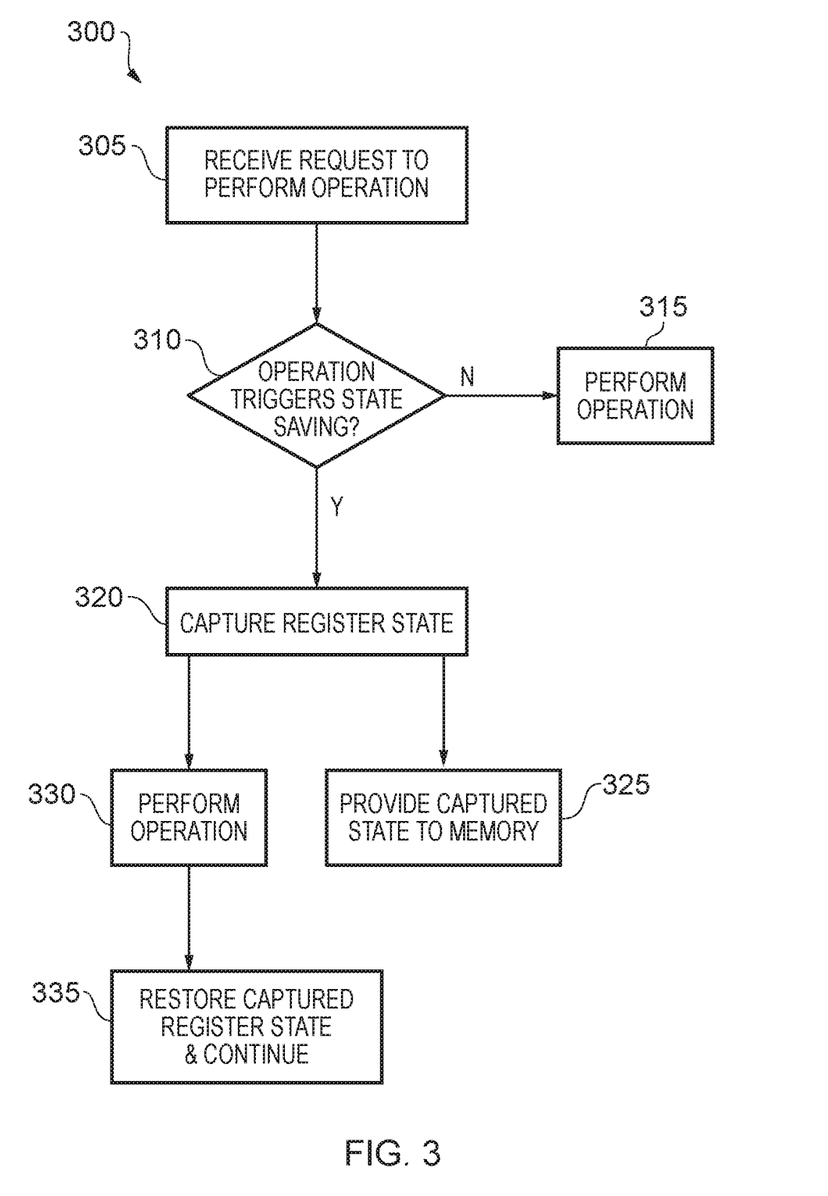
FIG. 3 shows a method for processing an operation according to an example.

FIG. 3 shows a method 300 for processing an operation according to an example of the present disclosure.

The method 300 begins at block 305, where a request to perform an operation is received.

At block 310 it is determined whether the operation triggers state saving. If not, flow proceeds to block 315 where the operation is performed.

If it is determined that the operation is a state-saving-triggering operation, flow proceeds to block 320 where the register state is captured in shadow registers.

After capture of the register state, the captured state is provided from the shadow registers to memory at block 325.

In parallel with the provision of the captured state to memory, the requested operation is performed at block 330.

After performance of the requested operation, the captured register state is restored at block 335 and processing continues from the point at which the state was saved.

Figure 4:
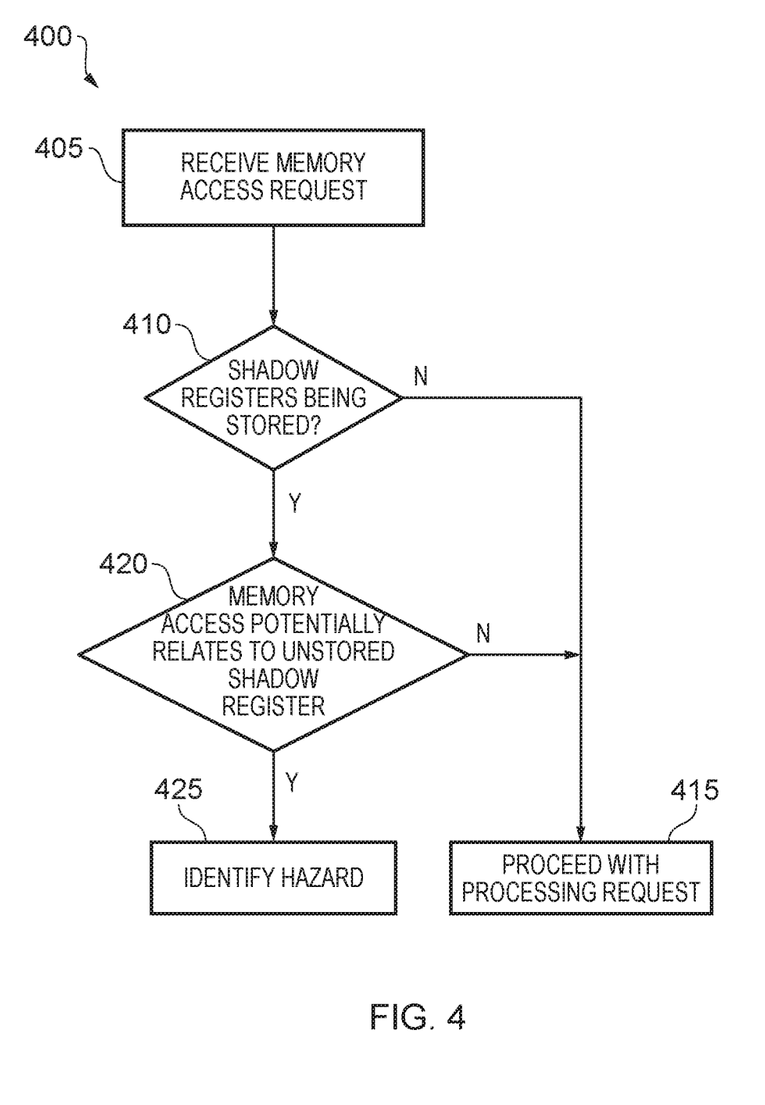
FIG. 4 shows a method for mitigating data hazards, associated with memory requests, according to an example.

FIG. 4 shows a method 400 for mitigating data hazards associated with memory requests in systems according to aspects of the present disclosure. Such hazards can arise if data is accessed during provision of data from shadow registers to memory: as explained above, out-of-date data can be inadvertently retrieved if an attempt is made to access that data from memory before it has been updated from the shadow registers.

At block 405, a memory access request is received. For example, the received request may identify a memory address from which data is to be loaded.

At block 410, it is determined whether the shadow registers are in the process of being stored (e.g. as shown between times t1 and t2b in FIG. 2B). If the shadow registers are not in the process of being stored, there is no risk that an out-of-date version of the requested data will inadvertently be retrieved from memory as a consequence of not having been updated from the shadow registers. Flow therefore proceeds to block 415, where the memory access request is processed.

If it is determined that the shadow registers are in the process of being stored, flow proceeds to block 415 where it is determined whether the requested memory access potentially relates to an un-stored shadow register. For example, an address range associated with the shadow registers may be stored in lieu of storing an individual address for each shadow register (e.g. indicated by way of a base address and an indication of an extent of a stack frame to which the register content is being stored). In such a system, it is possible to determine whether a requested memory access relates to an address within that address range, but it may not be possible to determine whether data associated with that specific memory address has yet been stored from the corresponding shadow register. In such a situation, it can be determined that the requested memory access potentially relates to an un-stored shadow register.

If the requested memory access does not potentially relate to an un-stored shadow register (for example because it relates to a memory address outside the aforementioned stored address range), it can be assumed that no data hazard is present as a consequence of not having been updated from the shadow registers. Flow therefore proceeds to block 415, where the memory access request is processed.

If the requested memory access does potentially relate to an un-stored shadow register (for example because it relates to a memory address within the aforementioned stored address range, and/or because it expresses a memory address from which data is to be loaded relative to a stack pointer), flow proceeds to block 420 where the memory access request is identified as relating to a data hazard. A data hazard mitigation action can then be taken. For example, servicing of the data access request may be delayed until the storing of the contents of the shadow registers has been completed.

Apparatuses and methods are thus provided for processing state-saving-triggering operations such as interrupts.

From the above description it will be seen that the techniques described herein provides a number of significant benefits. In particular, the speed and efficiency of processing state-saving-triggering operations such is improved, without incurring the costs and performance reductions that would be associated with extending the size of a store buffer.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

I claim:

1. An apparatus comprising:
register circuitry implementing a plurality of registers;
processing circuitry to perform data processing operations on data stored in said registers;
store buffer circuitry to, responsive to a store instruction in respect of given data, temporarily store said given data prior to providing said given data to a memory;
wherein, responsive to receiving at the processing circuitry a request to perform a state-saving-triggering operation, the register circuitry is configured to:
capture in shadow registers of said register circuitry a state of a subset of registers of the plurality of registers; and
provide the captured state from the shadow registers to the memory.

2. An apparatus according to claim 1, wherein the processing circuitry is configured to initiate performance of the requested state-saving-triggering operation before completion of provision of the captured state from the register circuitry to the memory.

3. An apparatus according to claim 1, wherein capturing the state of said subset of registers comprises copying the contents of said subset of registers to the shadow registers.

4. An apparatus according to claim 3, wherein each shadow register corresponds to one of said subset of registers, and capturing the state of a given register of said subset of registers comprises storing the contents of the said given register in a corresponding shadow register.

5. An apparatus according to claim 1, wherein capturing the state of said subset of registers comprises updating mapping information identifying which of said plurality of registers are the shadow registers.

6. An apparatus according to claim 1, wherein the processing circuitry is responsive to receiving a memory access request to perform hazard checking to detect whether the memory access request causes a data hazard condition;
the data hazard condition occurring at least when, before completion of provision of the captured state to the memory, the memory access request has a potential to access a memory address to which data from one of said shadow registers is still to be saved to memory.

7. An apparatus according to claim 6, wherein the hazard checking permits a false positive detection of the data hazard condition.

8. An apparatus according to claim 6, in which a probability of a false positive detection of the data hazard condition is higher for the hazard checking performed for the shadow registers than in hazard checking performed for the store buffer.

9. An apparatus according to claim 1, wherein capturing the state of said subset of registers comprises storing an indication of a stack frame address range within which the data from said subset of registers is to be saved to memory.

10. An apparatus according to claim 9, wherein the indication of the stack frame address range comprises a base address of the stack frame address range and an indication of the extent of the stack frame address range.

11. An apparatus according to claim 9, wherein, before completion of the provision of the captured state to the memory and responsive to receiving a data processing request indicating a memory address within the stack frame address range, the processing circuitry is configured to perform a data hazard mitigation action in respect of the received data processing request.

12. An apparatus according to claim 11, wherein the data hazard mitigation action comprises delaying processing of the received data processing request until completion of the storing of the captured state in the memory.

13. An apparatus according to claim 1 wherein, before completion of the provision of the captured state to the memory and responsive to receiving a stack-pointer-relative memory access request for which a target memory address is to be determined relative to a stack pointer, the processing circuitry is configured to perform a data hazard mitigation action in respect of the received data processing request.

14. An apparatus according to claim 13, wherein the processing circuitry is configured to determine whether to perform the data hazard mitigation action for the stack-pointer-relative memory access request independent of the target memory address.

15. An apparatus according to claim 1, wherein the state-saving-triggering operation is one of:
an interrupt operation;
an exception operation; and
a function call operation.

16. An apparatus according to claim 15 wherein the state-saving-triggering operation is a function call operation for which the function call operation comprises transitioning from a higher security operating state to a lower security operating state.

17. An apparatus according to claim 1, wherein, after performing by the processing circuitry of the state-saving-triggering operation, the register circuitry is configured to restore the captured state in said registers.

18. An apparatus according to claim 17, wherein restoring the captured state comprises, responsive a determination of a lack of overwriting of the shadow registers, restoring the captured state from the shadow registers.

19. An apparatus comprising:
register means implementing a plurality of registers;
processing means to perform data processing operations on data stored in said registers;
store buffer means to, responsive to a store instruction in respect of given data, temporarily store said given data prior to providing said given data to a memory;
wherein, responsive to receiving at the processing circuitry a request to perform a state-saving-triggering operation, the register means is configured to:
capture in shadow registers of said register means a state of a subset of registers of the plurality of registers; and
provide the captured state from the shadow registers to the memory.

20. A method comprising:
storing data in registers associated with processing circuitry;
receiving a request to perform a state-saving-triggering operation in respect of given data of said data; and
responsive to said request:
capturing, in shadow registers corresponding to said registers, a state of a subset of said registers; and
providing the captured state from the shadow registers to a memory.

* * * * *